United States Patent
Kim et al.

(10) Patent No.: US 11,142,241 B2
(45) Date of Patent: Oct. 12, 2021

(54) METHOD FOR TOE VARIABLE CONTROL OF A REAR WHEEL STEERING SYSTEM

(71) Applicants: HYUNDAI MOTOR COMPANY, Seoul (KR); KIA MOTORS CORPORATION, Seoul (KR)

(72) Inventors: Jong-Min Kim, Gwangmyeong-si (KR); Bo-Min Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 311 days.

(21) Appl. No.: 16/357,935

(22) Filed: Mar. 19, 2019

(65) Prior Publication Data

US 2020/0108863 A1 Apr. 9, 2020

(30) Foreign Application Priority Data

Oct. 8, 2018 (KR) .................. 10-2018-0119708

(51) Int. Cl.
  *B62D 6/00* (2006.01)
  *B62D 17/00* (2006.01)
  *B62D 9/00* (2006.01)

(52) U.S. Cl.
  CPC ............... *B62D 6/00* (2013.01); *B62D 9/00* (2013.01); *B62D 17/00* (2013.01)

(58) Field of Classification Search
  CPC . B62D 6/00; B62D 17/00; B62D 9/00; B62D 7/159

USPC ........................................................... 701/41
  See application file for complete search history.

(56) References Cited

U.S. PATENT DOCUMENTS

| | | | | |
|---|---|---|---|---|
| 8,670,900 | B2* | 3/2014 | Nishioka | B62D 7/146 701/41 |
| 2008/0054577 | A1* | 3/2008 | Horiuchi | B62D 6/02 280/5.522 |
| 2009/0194965 | A1* | 8/2009 | Boston | B60G 3/20 280/124.136 |
| 2010/0204888 | A1* | 8/2010 | Nishioka | B62D 17/00 701/41 |
| 2012/0175857 | A1* | 7/2012 | Mathis | B60G 3/20 280/124.113 |
| 2016/0144890 | A1* | 5/2016 | Kim | B62D 6/002 701/41 |

FOREIGN PATENT DOCUMENTS

| | | |
|---|---|---|
| JP | 2010234935 | 10/2010 |
| JP | 2013230791 | 11/2013 |
| KR | 2005088736 | 4/2005 |
| KR | 1020080093260 | 10/2008 |
| KR | 100880110 | 1/2009 |

* cited by examiner

*Primary Examiner* — Shardul D Patel
(74) *Attorney, Agent, or Firm* — Lempia Summerfield Katz LLC (57) ABSTRACT

A toe variable control method includes a toe linearization mapping control in which a toe control is switched from a constant control amount to a variable control amount in a rear wheel steering system by bump/rebound speeds of a bump and a rebound becoming a variable when the bump and rebound of a wheel are detected by a controller.

15 Claims, 6 Drawing Sheets

METHOD FOR TOE VARIABLE CONTROL OF A REAR WHEEL STEERING SYSTEM

CROSS-REFERENCE TO RELATED APPLICATION

This application claims priority to Korean Patent Application No. 10-2018-0119708, filed on Oct. 8, 2018, which is incorporated herein by reference in its entirety.

BACKGROUND OF THE DISCLOSURE

Field of the Disclosure

Embodiments of the present disclosure relate to a rear wheel steering system, and more particularly, to a method for toe variable control capable of maintaining a toe linearization control effect for rear wheels even in bump and rebound.

Description of Related Art

Generally, unlike front wheel steering for steering front wheels, Rear Wheel Steering (hereinafter, RWS) for steering rear wheels has characteristics capable of forcibly controlling toe-in of the rear wheels according to a driver's handling (i.e. steering) condition.

As an example, the RWS implements a yaw-following control for controlling a vehicle attitude change according to traveling as basic performance of the RWS. The RWS also implements a toe linearization control for controlling a wheel stroke change according to handling as control performance of the RWS. Particularly, the toe linearization control makes the toe control effect of the RWS linear by applying control amount linearization with respect to the toe-in value of the rear wheels caused by the wheel stroke change. Thus, the toe linearization control enhances cornering stability to increase the lateral force of rear wheel.

As described above, the RWS enhances the stability by the rear-wheel lateral force through the compulsory toe-in with respect to the rear wheels during smooth handling. This greatly contributes to the enhancement of handling/agility/stability of the vehicle.

The contents described in the Description of Related Art section are to help the understanding of the background of the present disclosure. The Description of Related Art section can include what is not previously known to those having ordinary skill in the art to which the present disclosure pertains.

SUMMARY OF THE DISCLOSURE

The toe linearization control applied to the RWS is tuned to the weak characteristics of bump/rebound during smooth handling. Thus, it is difficult to maintain the toe linearization control effect when a relatively big change in the bump/rebound occurs.

This is because, in vehicle suspensions, bump and rebound caused by geometry can bring not only a sudden speed change due to a berm or a pothole during handling, but also a speed change due to handling weight transfer during handling in a flat area. The sudden speed change of the bump and rebound and the speed change due to the handling weight transfer can cause a change in the weight on the ground surface of a tire that is important for handling. Thus, an additional toe control is necessary for handling/stability of the vehicle.

As an example, a sudden bump due to a berm or a sudden rebound due to a pothole causes the weight to be greatly increased or decreased temporarily on the ground surface of a tire of the rear wheel. Thus, an action of a lateral force of the rear wheel is suddenly increased causing understeer to be increased. Accordingly, toe reduction is required through toe-in for understeer reduction so that attitude instability, which is due to the sudden bump or to the tire impact due to the sudden rebound, is controlled in a manner to be reduced. In addition, a smooth bump or a smooth rebound according to the handling weight transfer causes the weight to be temporarily changed on the ground surface of the tire of the rear wheel. Thus, the action of the lateral force of the rear wheel is suddenly decreased to cause understeer to be reduced. Accordingly, toe increase is required through toe-out to increase understeer so that a limited cornering ability of the handling weight transfer, which is due to the smooth bump, or a limited cornering ability of the handling weight transfer, which is due to the smooth rebound, is controlled in a manner to be improved.

Accordingly, the control amount of the linearization control has limitations. It is not possible to reflect the sudden bump/rebound in the berm/pothole and the bump/rebound of the handling weight transfer in a flat area. Such limitations can cause a dangerous driving condition on which sudden bump or rebound occurs and can cause deterioration of the overall control performance of the RWS during the handling weight transfer.

Accordingly, an object of the present disclosure, considering the above, is to provide a method for toe variable control of a rear wheel steering system. The method can effectively perform directly and promptly the compensation or implementation of the toe change amount by implementing a toe linearization mapping control in a toe-wheel stroke diagram reflecting the Kinematic & Compliance (K&C) characteristics directly measured in a vehicle. The method can maintain a control amount linearization effect even in a sudden speed change of a bump due to a berm and a rebound due to a pothole and in a speed change according to handling weight transfer in a flat area.

A toe variable control method of the present disclosure for achieving the object includes a toe linearization mapping control in which a toe control is switched from a constant control amount to a variable control amount in a rear wheel steering system by bump/rebound speeds of a bump and a rebound being used as a variable when the bump and rebound of a wheel are detected by a controller.

According to one embodiment, the bump/rebound speeds are detected by a wheel stroke sensor.

According to one embodiment, the toe linearization mapping control performs determining whether or not to apply the toe linearization mapping control at the bump/rebound speeds, determining a toe control amount B by matching the bump/rebound speeds with a toe-wheel stroke line diagram, performing a speed mapping to switch the toe control amount B from a constant control amount to a variable control amount, switching the toe control amount B to the variable control amount of a toe reduction control amount C or a toe increase control amount D or maintaining it as the constant control amount, and performing a toe control by outputting the toe control amount B or the toe reduction control amount C or the toe increase control amount D.

According to one embodiment, the determining whether or not to apply the toe linearization mapping control in the toe linearization mapping control applies the bump/rebound speeds or applies a differential for bump/rebound locations. The matching of the toe-wheel stroke line diagram applies the bump speed/the rebound speed, a vehicle speed, a steering angle, and any one of the bump speed/the rebound speed, the vehicle speed, and the steering angle.

According to one embodiment, the speed mapping in the toe linearization mapping control applies the bump/rebound speeds and the vehicle speed. The toe reduction control amount C is determined when the bump/rebound speeds and the vehicle speed are greater than threshold values, respectively, while the toe increase control amount D is determined when the bump/rebound speeds and the vehicle speed are smaller than threshold values, respectively.

According to one embodiment, the toe variable control method further includes a toe linearization control in which the toe control is maintained as the constant control amount in the rear wheel steering system when the bump/rebound locations for the bump and the rebound become a variable. The toe linearization control performs determining the toe control amount B by matching the bump/rebound locations to a toe-wheel stroke line diagram, and performing the toe control by outputting the toe control amount B. In this case, the matching of the toe-wheel stroke line diagram applies the bump speed/the rebound location, a steering angle, and any one of the bump speed/the rebound location and the steering angle.

According to one embodiment, the toe variable control method further includes a yaw-following control in which the toe control is maintained as a basic control amount F in the rear wheel steering system when the bump and the rebound are not detected.

A rear wheel steering system of the present disclosure for achieving the object includes a controller for performing any one of a toe linearization mapping control in which a toe control of a rear wheel RW is switched from a constant control amount to a variable control amount by applying bump/rebound speeds, a toe linearization control in which the toe control of the rear wheel is maintained as the constant control amount by applying bump/rebound locations, and a yaw-following control in which the toe control of the rear wheel RW is maintained as a basic control amount F by not applying bump/rebound.

According to one embodiment, the controller includes a toe control map having a basic control amount map for calculating a RWS drive basic control amount F applied to the yaw-following control, a toe linearization map for calculating a toe control amount B applied to the toe linearization control, a toe linearization mapping map for calculating a toe reduction control amount C and a toe increase control amount D applied to the toe linearization mapping control, and a summer for summing the RWS drive basic control amount F, the toe control amount B, the toe reduction control amount C, and the toe increase control amount D to generate it as an output signal.

According to one embodiment, the controller is connected to a sensor. The sensor includes a wheel stroke sensor for detecting bump/rebound locations or bump/rebound speeds of left and right rear wheels, a vehicle speed sensor for detecting a vehicle speed, and a steering angle sensor for detecting a steering angle.

The toe variable control applied to the rear wheel steering system of the present disclosure implements the following actions and effects by reflecting the bump and rebound of the handing weight transfer in a berm/a pothole and a flat area.

First, it is possible to enhance RWS performance by the toe change linearization for each bump/rebound caused by the suspension geometry of the vehicle. Second, it is possible to greatly enhance handling/agility/stability through additional toe adjustment of the rear wheel reflecting the bump and the rebound. Third, it is possible to enhance the limited cornering ability of the vehicle by increasing the toe control amount during handling through the smooth weight transfer that weakly changes the bump/rebound. Fourth, it is possible to compensate for a sudden speed change in the bump/rebound by the additional toe adjustment, thus maintaining stability of the vehicle in the suddenly encountered berm or pothole situation. Fifth, it is possible to implement logic for varying the RWS toe control so that the toe linearization control effect is maintained according to the total amount of the bump/rebound. Sixth, it is possible to effectively compensate the toe change amount directly and quickly because the RWS toe control variable logic uses the Kinematic & Compliance (K&C) characteristics directly measured in the vehicle.

DESCRIPTION OF SPECIFIC EMBODIMENTS

Hereinafter, embodiments of the present disclosure are described in detail with reference to the accompanying drawings. The embodiments can be embodied by those having ordinary skill in the art to which the present disclosure pertains in various different forms as an example, such that it is not limited to the embodiments described herein.

Figure 1A:
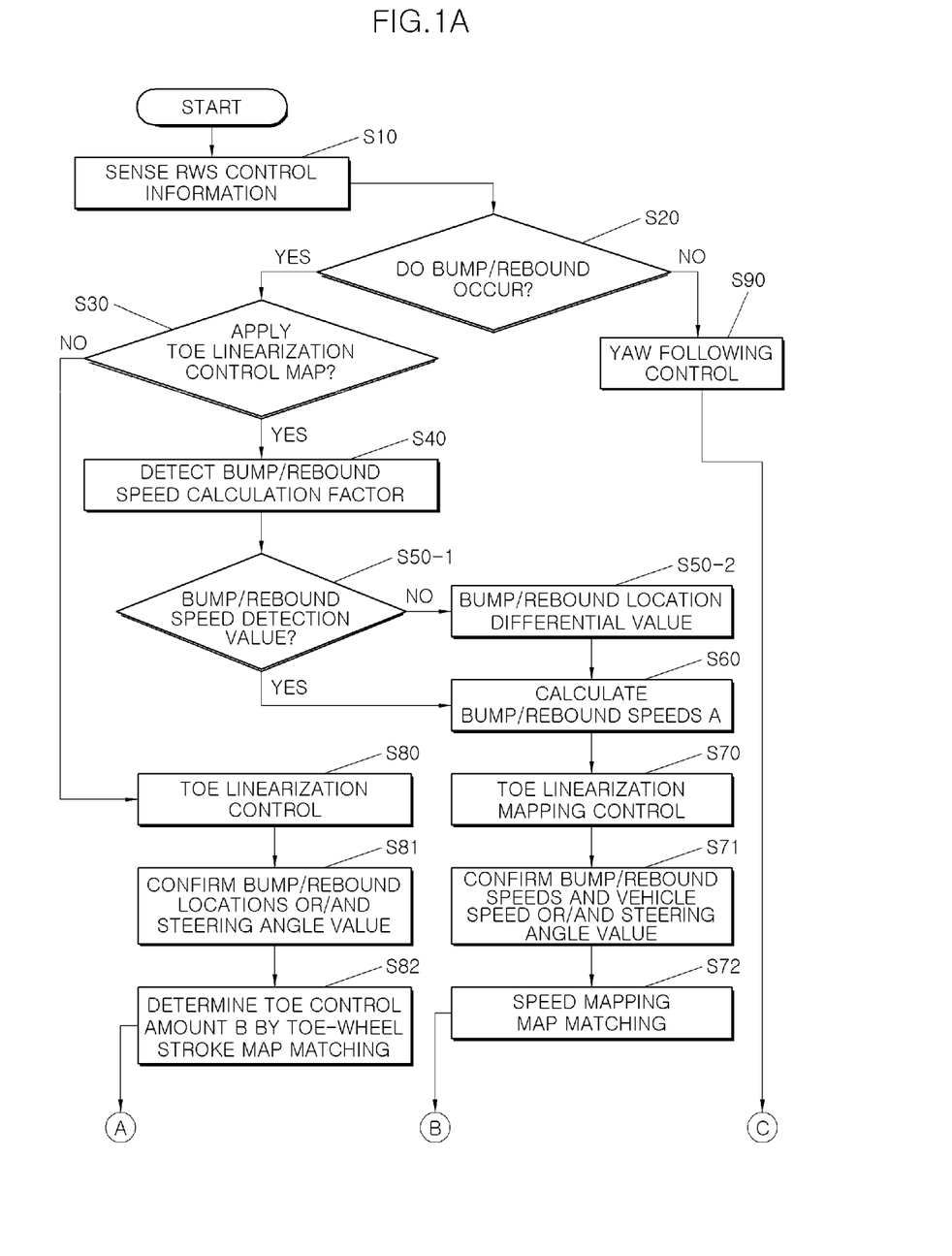
FIGS. 1A and 1B are a flowchart of a control system to perform a toe variable control method for a rear wheel steering system in accordance with the present disclosure.
Figure 1B:
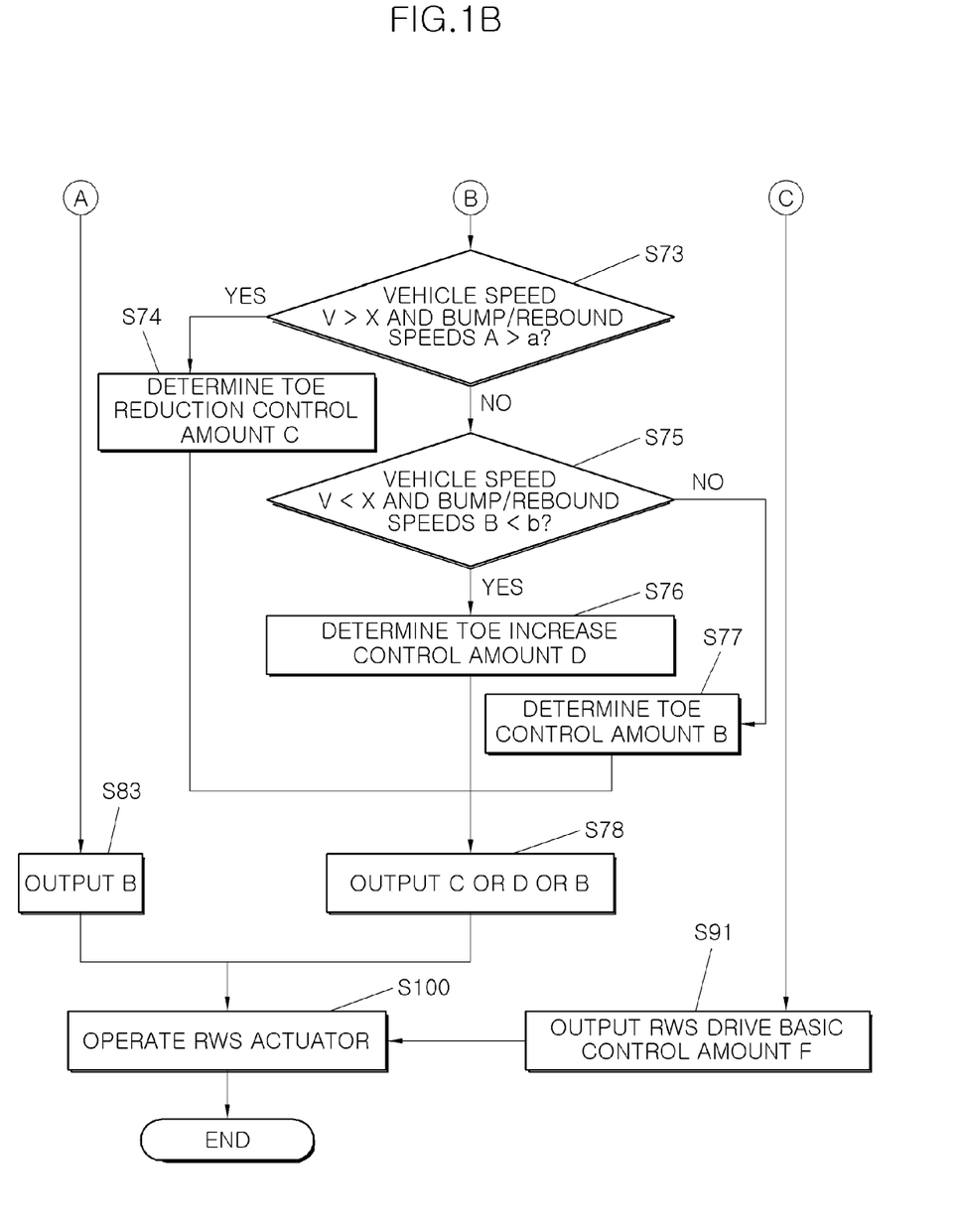

Referring to FIGS. 1A and 1B, a control system to perform a toe variable control method is classified into a yaw-following control S90, a toe linearization mapping control S70-S78, or a toe linearization control S80. In a yaw-following control S90, a Rear Wheel Steering (RWS) actuator operation [S100] is performed by a RWS drive basic control amount F [S91] as in the conventional method by detecting RWS control information [S10] and then confirming occurrence of bump/rebound [S20]. In a toe linearization mapping control [S70]~[S78], the RWS actuator operation [S100] is performed by toe reduction/increase after determining whether or not to apply a toe linearization control map [S30]~[S60]. In a toe linearization control [S80], the RWS actuator operation [S100] is performed by a toe control amount B.

Accordingly, the toe variable control method can instantaneously compensate for the additional determination of the control direction at a bump speed without delay/error caused when performing the compensation by the rolling/braking based on the equation while measuring a toe change amount in real time. Thus, vehicle handling/stability is enhanced according to sudden bump/rebound in a berm/a pothole and the bump/rebound speeds of handing weight transfer in a flat area.

Figure 2:
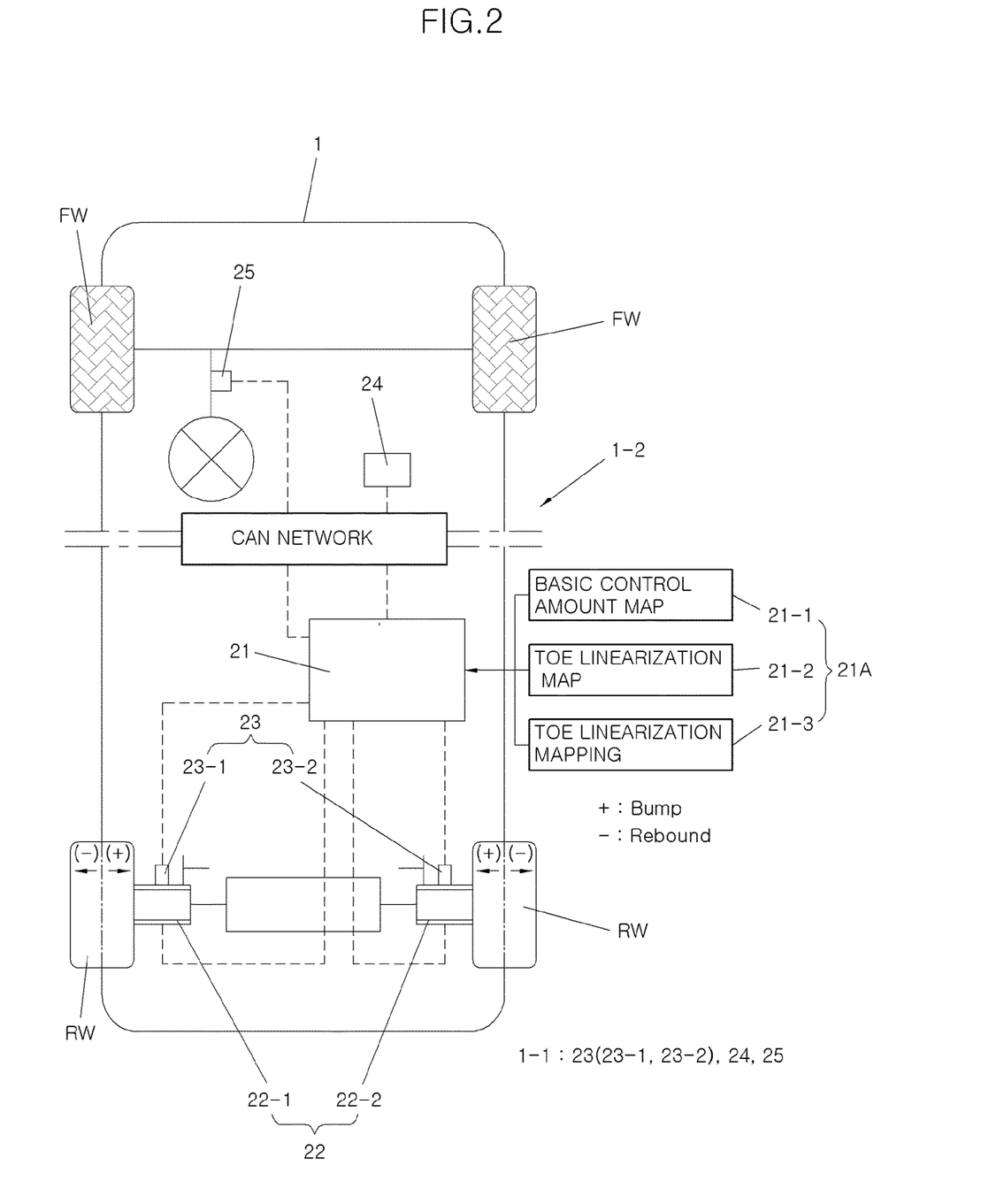
FIG. 2 is an example of the rear wheel steering system in which a toe variable control is implemented in accordance with the present disclosure.

Then, referring to FIG. 2, a rear wheel steering system 1-2 controls the rear wheels RW of a vehicle 1 in connection with a sensor 1-1. In this case, the rear wheel steering system 1-2 can be classified into Toe In/Out for each bump/rebound due to suspension geometry during traveling of the vehicle 1 to change toe of the rear wheel, thus enhancing performance of handling/agility/stability. Particularly, the rear wheel steering system 1-2 can be connected with an Active Geometry Control System (AGCS) to strengthen the enhancement of the stability of the vehicle by adjusting a toe angle according to a steering angle and a steering angular speed.

For example, the sensor 1-1 includes a wheel stroke sensor 23 installed on the left and right rear wheels RW, respectively. The sensor 23 includes left and right wheel stroke sensors 23-1, 23-2, respectively, at the rear wheels RW in this example for detecting the bump/rebound locations and bump/rebound speeds of the rear wheels RW. The sensor 1-1 also includes a steering angle sensor 25 for detecting a steering angle indicating the steering intention of a driver.

In one example, the rear wheel steering system 1-2 includes a controller 21 (or a RWS Electronic Control Unit (ECU)), and an actuator 22, which includes left and right actuators 22-1, 22-2, respectively, at the rear wheels RW in this example.

Figure 4:
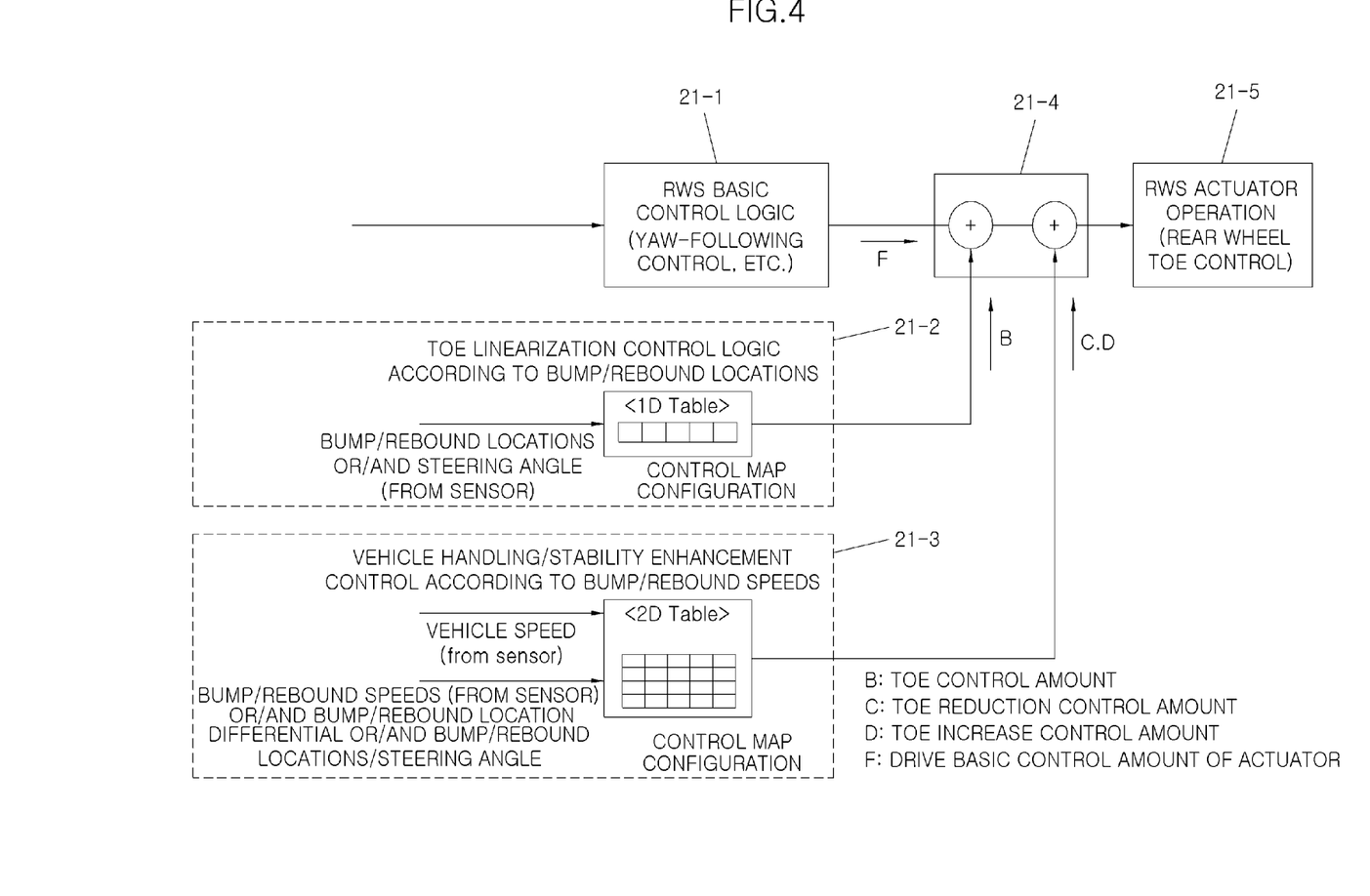
FIG. 4 is a configuration example of a block diagram for the toe variable control reflecting the bump/rebound in accordance with the present disclosure.

The controller 21 is configured to systematically exchange a signal between the sensor 1-1 for detecting the bump/rebound amounts for each wheel of the rear wheels RW and the rear wheel steering system 1-2 via a CAN network. Particularly, the controller 21 has a toe control map 21A. The toe control map 21A is classified into a basic control amount map 21-1, a toe linearization map 21-2, and a toe linearization mapping map 21-3. The basic control amount map 21-1 is for calculating a RWS drive basic control amount F applied to the yaw-following control [S90]. The toe linearization map 21-2 is for calculating a toe control amount B applied to the toe linearization control S80. The toe linearization mapping map 21-3 is for calculating toe reduction/increase control amounts C/D applied to the toe linearization mapping control [S70]. In addition, the controller 21 further includes a summer 21-4 and a signal output unit 21-5 as illustrated in FIG. 4, and their functions are described later.

Hereinafter, the toe variable control method of FIGS. 1A and 1B is described in detail with reference to FIGS. 2-5. In this case, a control subject is the controller 21. A controlled object is the actuator 22 composed of the left actuator 22-1 applied for the toe control of the left rear wheel and the right actuator 22-2 applied for the toe control of the right rear wheel.

The controller 21 performs the detecting of the RWS control information [S10]. Referring to FIG. 2, the controller 21 detects the wheel strokes for the left and right rear wheels RW from each of the left and right wheel stroke sensors 23-1, 23-2. The controller 21 does so to read the bump/rebound locations and the bump/rebound speeds, to read the vehicle speed from the vehicle speed sensor 24, and to read the steering angle indicating the steering intention of the driver from the steering angle sensor 25. Thus, the detecting of the RWS control information [S10] is performed.

Then, the controller 21 performs determining whether or not the bump/rebound occurs [S20]. In this case, the determining whether or not the bump/rebound occurs is implemented by the bump/rebound locations and the bump/rebound speeds that can be recognized from the left and right wheel stroke sensors 23-1, 23-2.

As a result, when the bump/rebound do not occur, the rear wheel steering system 1-2 is switched to the yaw-following control [S90] to control the RWS actuator operation [S100] by the conventional toe control method using the RWS drive basic control amount F as in S91. On the other hand, when the bump/rebound occur, it is switched to determining whether or not to apply the toe linearization control map [S30].

Thereafter, the controller 21 performs the determining whether or not to apply the toe linearization control map [S30]. In this case, the determining whether or not to apply the toe linearization mapping control considers the bump/rebound speeds so that the rear wheel steering system 1-2 is not switched to the toe linearization mapping control instead of the toe linearization control when only the bump/rebound locations are changed due to occurrence of smooth bump/rebound.

As a result, when the bump/rebound speeds are considered, a bump/rebound speed calculation factor is detected [S40] to calculate the bump/rebound speeds A [S60]. Then, the toe linearization mapping control [S70] is entered. In this case, the detecting the bump/rebound speed calculation factor [S40] first applies a bump/rebound speed detection value [S50-1], and can use a bump/rebound location differential value [S50-2] instead of the bump/rebound speed detection value. On the other hand, when only the bump/rebound locations are considered, the rear wheel steering system 1-2 is switched to the toe linearization control [S80].

Specifically, for the toe linearization mapping control [S70], the controller 21 undertakes performing toe linearization mapping [S71], performing speed mapping map matching [S72], determining toe reduction [S73], determining a toe reduction control amount C according to the toe reduction determination [S74], determining toe increase [S75], determining a toe increase control amount D [S76] or determining a toe control amount B [S77], and outputting variable toe for the RWS actuator operation [S100] [S78].

Figure 3:
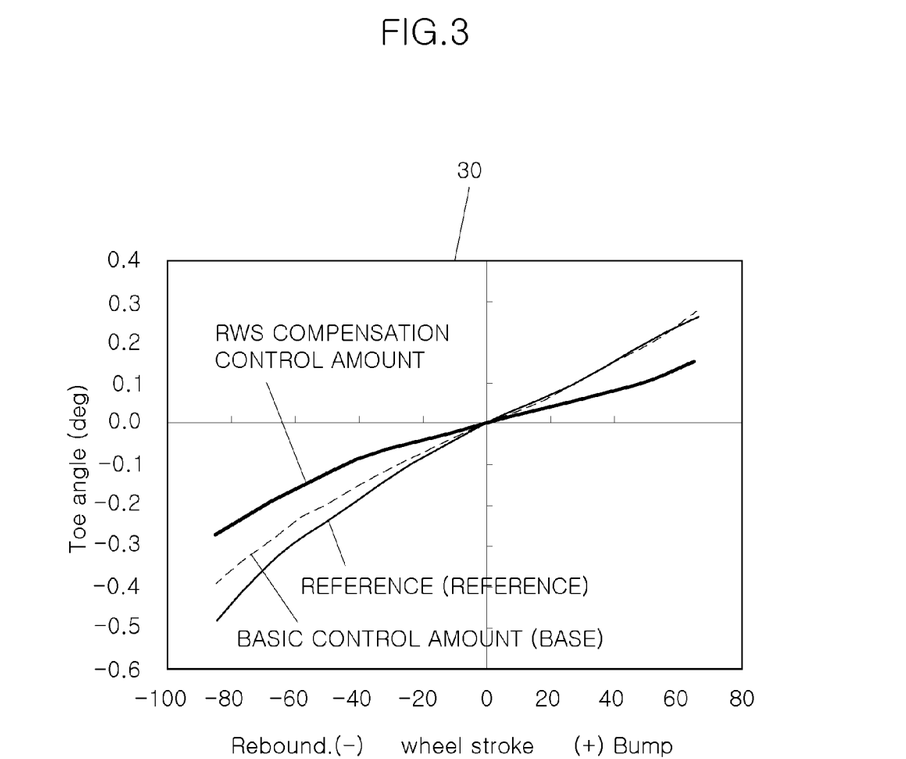
FIG. 3 is an example of a toe-wheel stroke line diagram for toe linearization mapping of the toe variable control in accordance with the present disclosure.

For example, the toe linearization mapping [S71] applies the bump/rebound speeds, the vehicle speed, the steering angle value, and any one of the bump/rebound speeds, the vehicle speed, and the steering angle value, and uses it as a bump/rebound speed variable to match it to the toe-wheel stroke line diagram 30 to determine the toe control amount B.

For example, the speed mapping [S72] uses the bump/rebound speeds and the vehicle speed, applies a toe reduction determination equation for determining the toe reduction [S73], and uses a toe increase determination equation for determining the toe increase [S75].

The toe reduction determination equation is:

vehicle speed $V>X$ and bump/rebound speeds $A>a$

The toe increase determination equation is:

vehicle speed $V<X$ and bump/rebound speeds $B<b$

Herein, the "X" refers to a vehicle speed threshold and is not limited to a specific value because the vehicle deceleration condition of the driver is changed according to the sizes of the berm and the pothole. The "a" refers to a threshold value of the bump/rebound speeds A and is not limited to a specific value because the sizes of the bump and the rebound are changed. The "b" refers to a threshold value of the bump/rebound speeds B and is not limited to a specific value because the sizes of the smooth bump/rebound caused by handling weight transfer during handling (i.e., steering) in a flat area are changed. The ">, <" refer to inequalities indicating the magnitude relationship of the two values.

Accordingly, when the vehicle speed V is greater than X and the bump/rebound speeds A are greater than a at the same time, the toe reduction with respect to the toe control amount B is determined. The toe reduction reduces understeer that is increased by the lateral force of the rear wheel RW as the tire ground surface weight of the rear wheel RW temporarily changes greatly by sudden bump or rebound due to the berm (high bump or rebound speed). That is, the RWS toe reduction control is applied to control the posture instability caused by the increase in a grasping force according to the sudden bump caused by the berm during handling (i.e., steering). The RWS toe reduction control is applied to reduce tire impact due to sudden rebound caused by the pothole during handling (i.e., steering).

Meanwhile, when the vehicle speed V is smaller than X and the bump/rebound speeds B are smaller than b, the toe increase with respect to the toe control amount B is determined. The toe increase increases understeer that is reduced by the lateral force of the rear wheel RW as the tire ground surface weight of the rear wheel RW temporarily changes by smooth bump or smooth rebound according to the handling weight transfer. That is, the RWS toe increase control is applied to enhance the limited cornering ability according to the smooth bump caused by the handing weight transfer during handling in a flat area, or the RWS toe increase control is applied to enhance the limited cornering ability according to the smooth rebound caused by the handing weight transfer during handling in a flat area.

For example, the outputting the variable toe [S78] is determined by any one of the toe reduction control amount C [S74], the toe increase control amount D [S76], and the toe control amount B S77, and outputs the variable toe [S78] for the RWS actuator operation S100.

Specifically, for the toe linearization control [S80], the controller 21 undertakes performing toe linearization mapping [S81], determining the toe control amount B by the toe-wheel stroke line diagram map mapping [S82], and outputting the toe control amount B for the RWS actuator operation [S100] [S83].

For example, the toe linearization mapping [S81] is performed by applying the bump/rebound locations and/or the steering angle value.

Referring to FIG. 3, the toe-wheel stroke line diagram 30 commonly used in the toe linearization mapping control [S70] and the toe linearization control [S80] is illustrated.

Specifically, the toe-wheel stroke line diagram 30 represents the rebound as a negative toe angle and the bump as a positive toe angle with respect to a toe angle of 0°, and is represented as a graph in which the basic control amount [BASE] and the RWS compensation control amount are distinguished from the control amount reference [REFERENCE] of the toe angle control for the bump/rebound. In this case, the RWS basic control amount [BASE] and the RWS compensation control amount are located above the control amount reference [REFERENCE] for the rebound, while the RWS compensation control amount is located below the control amount reference [REFERENCE] for the bump. Accordingly, the RWS basic control amount [BASE] and the RWS compensation control amount map the K&C characteristics directly measured in the vehicle with the control amount reference [REFERENCE], thus effectively compensating the toe change amount directly and quickly.

Accordingly, there is difference in that the toe linearization mapping control [S70] acquires the variable toe, by the RWS compensation control amount, while the toe linearization control [S80] acquires the RWS basic control amount [BASE] from the toe-wheel stroke line diagram 30 by the toe control amount B. The variable toe maps the vehicle speed and the speed condition of the bump/rebound with the toe control amount B acquired from the toe-wheel stroke line diagram 30.

Referring to FIG. 4, the controller 21 includes the basic control amount map 21-1, the toe linearization map 21-2, the toe linearization mapping map 21-3, the summer 21-4, and the signal output unit 21-5. The summer 21-4 provides the output of the signal output unit 21-5 for the operation of the left and right actuators 22-1, 22-2.

Specifically, the summer 21-4 sums: the RWS drive basic control amount F output from the toe control map 21A reflecting a yaw; the toe control amount B output from the toe linearization map 21-2 reflecting the bump/rebound locations and/or the steering angle; and the toe reduction control amount C or the toe increase control amount D that is output from the toe linearization mapping map 21-3 reflecting the bump/rebound speeds and/or the bump/rebound locations and/or the bump/rebound locations and the steering angle. An output signal is then generated that is output to the signal output unit 21-5.

Accordingly, the controller 21 uses the summer 21-4 to selectively output the RWS drive basic control amount F or the toe control amount B or the toe reduction control amount C or the toe increase control amount D that is output from the signal output unit 21-5 for the operation of the left and right actuators 22-1, 22-2 according to the control condition.

Figure 5:
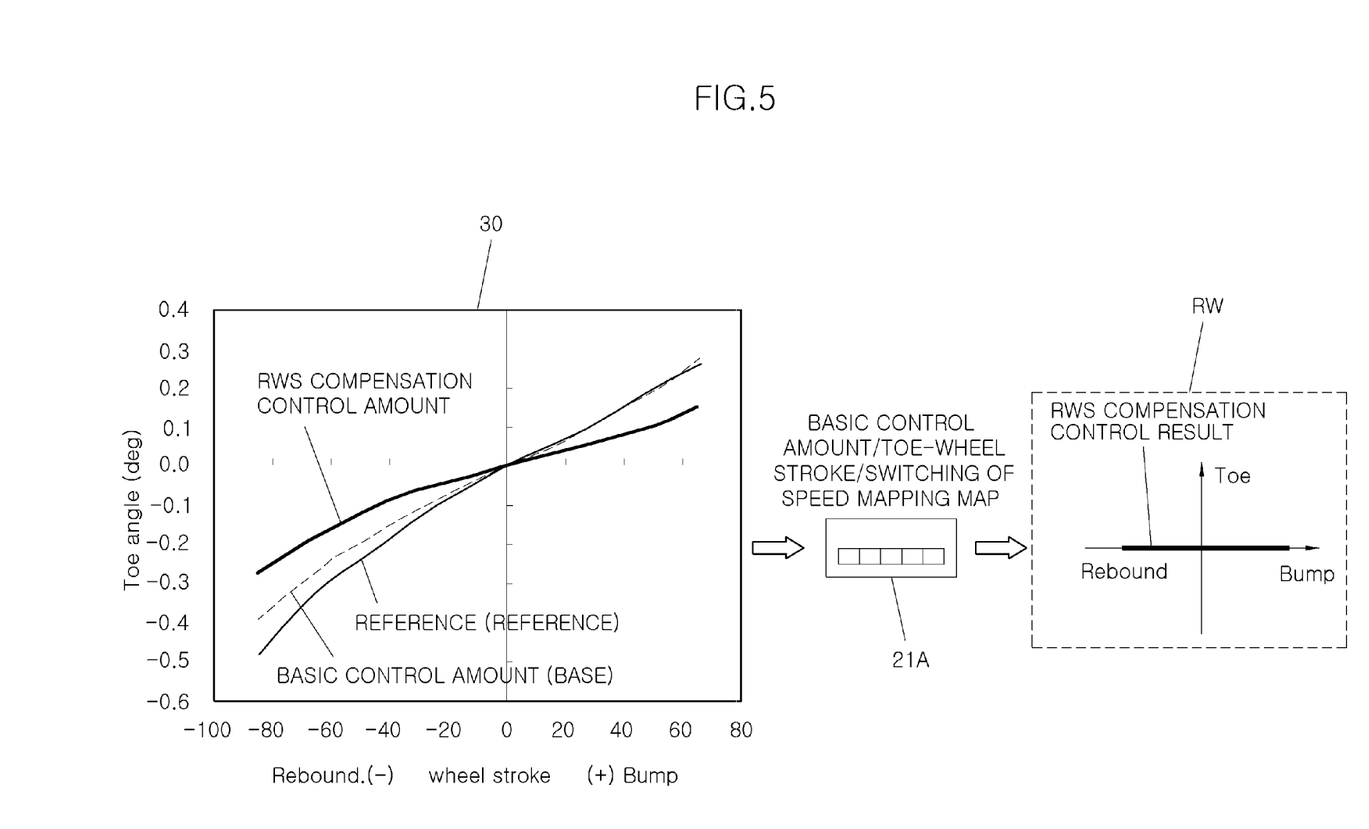
FIG. 5 is an example of the toe linearization control effect of the rear wheel steering system implemented by the toe variable control in accordance with the present disclosure.

Referring to FIG. 5, it can be seen that the RWS control amount linearization effect by the toe control map 21A, to which the toe-wheel stroke line diagram 30 is applied, is implemented by the variable toe of the toe reduction control amount C and the toe increase control amount D and the constant toe of the toe control amount B.

As described above, in the toe variable control method, the controller 21 confirms the bumper/rebound status information of the wheel by a rear wheel bump/rebound detecting device. The RWS toe variable control amount is determined by the bump/rebound information transmitted from the controller 21. Particularly, in determining the RWS toe variable control amount, the bump toe-in geometry can be controlled by the bump toe-out according to the bump/rebound versus the toe-in/out information mapping (i.e., the toe linearization control logic according to the bump/rebound locations) determined by the vehicle geometry. Also, the rebound toe-out can be controlled by the rebound toe-in by the geometry.

As a result, the toe variable control method performs the RWS toe reduction control for reducing the posture instability due to the increase in the tire grasping force upon sudden bump due to the berm during handling. The toe variable control method also performs the RWS toe increase control for enhancing the limited cornering ability upon smooth bump due to the handling weight transfer in a flat area. On the other hand, the toe variable control method performs the RWS toe reduction control for reducing the tire impact upon sudden rebound due to the pothole during handling. The toe variable control method also performs the RWS toe increase control for enhancing the limited cornering ability upon smooth rebound due to the handling weight transfer in a flat area. In this case, the RWS toe reduction/increase superimposes the bump/rebound variable control amount with the RWS drive basic control amount.

Accordingly, the toe variable control method effectively compensates or adjusts directly and quickly the toe change amount for the rear wheels RW by the linearization of the compensation map using the graph in the toe-wheel stroke line diagram 30 according to the bump/rebound of the vehicle by the Kinematic & Compliance (K&C) directly measured in the vehicle, the suspension geometry and bushing characteristics, etc. As a result, the RWS system 1-2 enhances performance of the handling/agility/stability of the vehicle.

As described above, the toe variable control method of the rear wheel steering system in accordance with the present embodiment includes the toe linearization mapping control. In the toe linearization mapping control, the toe control of the rear wheel or wheels RW is switched from the constant control amount to the variable control amount. The toe control is switched by applying the bump/rebound speeds of the controller 21, the toe linearization control in which the toe control of the rear wheel or wheels RW is maintained as the constant control amount by applying the bump/rebound locations, and the yaw-following control in which the toe control of the rear wheel RW is maintained as the basic control amount F by not applying the bump/rebound. Thus, the toe change amount is directly and quickly compensated or implemented. Particularly, the toe change amount effectively maintains the control amount linearization effect even in the sudden speed changes of a bump due to a berm and a rebound due to a pothole and also in the speed changes of the bump/rebound according to the handling weight transfer in a flat area.

What is claimed is:

1. A control system for a rear wheel steering vehicle, the control system comprising a toe linearization mapping control and a toe linearization control
   wherein the toe linearization mapping control in which a toe control is switched from a constant control amount to a variable control amount in a rear wheel steering system by bump/rebound speeds of a bump and a rebound being used as a variable when the bump and rebound of a wheel are detected by a controller,
   wherein a toe linearization control in which the toe control is maintained as the constant control amount in the rear wheel steering system when bump/rebound locations for the bump and the rebound become variable,
   wherein the variable control amount of the toe linearization mapping control acquires a variable toe as a Rear Wheel Steering (RWS) compensation control, the variable toe maps the vehicle speed and the speed condition of the bump/rebound with a toe control amount acquired from a toe-wheel stroke line diagram, while the constant control amount of the toe linearization control acquires a RWS basic control amount from the toe-wheel stroke line diagram by the toe control amount, and
   wherein the RWS basic control amount and the RWS compensation control amount are located above a control amount reference of the toe-wheel stroke line diagram for the rebound, while the RWS compensation control amount is located below the control amount reference of the toe-wheel stroke line diagram for the bump.

2. The control system of claim 1,
   wherein the bump/rebound speeds are detected by a wheel stroke sensor.

3. The control system of claim 1,
   wherein the toe linearization mapping control performs determining whether or not to apply the toe linearization mapping control at the bump/rebound speeds, determining the toe control amount by matching the bump/rebound speeds with the toe-wheel stroke line diagram, performing a speed mapping to switch the toe control amount from the constant control amount to the variable control amount, switching the toe control amount to the variable control amount of a toe reduction control amount or a toe increase control amount or maintaining the toe control amount as the constant control amount, and performing a toe control by outputting the toe control amount or the toe reduction control amount or the toe increase control amount.

4. The control system of claim 3,
   wherein the determining whether or not to apply the toe linearization mapping control applies the bump/rebound speeds or applies a differential for bump/rebound locations.

5. The control system of claim 3,
   wherein the matching of the toe-wheel stroke line diagram applies the bump speed/the rebound speed, a vehicle speed, a steering angle, and any one of the bump speed/the rebound speed, the vehicle speed, and the steering angle.

6. The control system of claim 3,
   wherein the speed mapping applies the bump/rebound speeds and the vehicle speed.

7. The control system of claim 6,
   wherein the toe reduction control amount is determined when the bump/rebound speeds and the vehicle speed are greater than threshold values, respectively.

8. The control system of claim 6,
   wherein the toe increase control amount is determined when the bump/rebound speeds and the vehicle speed are smaller than threshold values, respectively.

9. The control system of claim 1,
   wherein the toe linearization control performs determining the toe control amount by matching the bump/rebound locations of the RWS basic control amount to the toe-wheel stroke line diagram and by performing the toe control by outputting the toe control amount.

10. The control system of claim 9,
    wherein the matching of the toe-wheel stroke line diagram applies the bump speed/the rebound location, a steering angle, and any one of the bump speed/the rebound location and the steering angle.

11. The control system of claim 1,
    wherein the toe control is maintained as a basic control amount instead of the RWS basic control amount in the rear wheel steering system when the bump and the rebound are not detected.

12. A rear wheel steering system comprising:
    a controller configured to execute the toe control via the control system of claim 1, and
    the controller for performing any one of the toe linearization mapping control in which the toe control of a rear wheel is switched from the constant control amount to the variable control amount by applying the bump/rebound speeds, the toe linearization control in which the toe control of the rear wheel is maintained as the constant control amount by applying the bump/rebound locations, and a yaw-following control in which the toe control of the rear wheel is maintained as a RWS drive basic control amount instead of the RWS basic control amount by not applying the bump and the rebound.

13. The rear wheel steering system of claim 12,
    wherein the controller comprises a toe control map, and the toe control map includes a basic control amount map for calculating the RWS drive basic control amount applied to the yaw-following control, a toe linearization map for calculating a toe control amount applied to the toe linearization control, and a toe linearization mapping map for calculating a toe reduction control amount and a toe increase control amount applied to the toe linearization mapping control.

14. The rear wheel steering system of claim 13, wherein the controller comprises a summer, and the summer sums the RWS drive basic control amount, the toe control amount, the toe reduction control amount, and the toe increase control amount to be generated as an output signal.

15. The rear wheel steering system of claim 12, wherein the controller is connected to a sensor, and the sensor comprises a wheel stroke sensor for detecting bump/rebound locations or bump/rebound speeds of left and right rear wheels, a vehicle speed sensor for detecting a vehicle speed, and a steering angle sensor for detecting a steering angle.

\* \* \* \* \*